United States Patent [19]

Kamachi

[11] 3,749,890

[45] July 31, 1973

[54] DIVISION LOGIC CIRCUIT

[75] Inventor: Shin-ichi Kamachi, Tokyo, Japan

[73] Assignee: Olympus Optical Co., Ltd., Tokyo, Japan

[22] Filed: June 21, 1971

[21] Appl. No.: 154,796

[52] U.S. Cl. ........ 235/92 CP, 235/154, 235/92 CV, 235/92 R, 235/92 SH

[51] Int. Cl. .......................................... H03k 13/24

[58] Field of Search .................. 235/92 CA, 92 LG, 235/92 CP, 92 CV, 92 SH, 154

[56] References Cited

UNITED STATES PATENTS

| | | | |
|---|---|---|---|
| 2,954,165 | 9/1960 | Myers | 235/92 CP |
| 3,213,268 | 10/1965 | Ellersick | 235/154 |

*Primary Examiner*—Maynard R. Wilbur
*Assistant Examiner*—Joseph M. Thesz, Jr.
*Attorney*—Hans Berman

[57] ABSTRACT

Division logic circuit for measuring the amount of displacement such as in length and angle by counting pulses each corresponding to a finely divided unit in length or angle by an electronic counter. A pulse is generated at the rise or descent of each pulse in one of a plurality of specifically quantized signals determined in relation to the variation in the amount of displacement so as to be counted by the electronic counter, and discriminating circuits generate output signals each indicative of the specific combination of the conditions of all the quantized signals thereby permitting the displacement corresponding to a finely divided unit in length or angle to be detected so that the displacement to be measured is digitally counted by using the above two kinds of signals at a speed higher than the maximum response speed of the electronic counter.

2 Claims, 22 Drawing Figures

INVENTOR
Shin-ichi Kamachi
BY Kelman and Berman
AGENTS

Fig. 3

| UNIT \ CONDITION OF SIGNALS | a | b | c | d | e |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 0 | 0 | 1 |

Fig. 4

| D (a | b | c | d | e) | D | π + | π − |
|---|---|---|---|---|---|---|---|
| 0 | 0 | 0 | 0 | 0 | 0 | 0 | 0 |
| 0 | 0 | 0 | 0 | 1 | 1 | 1 | 4 |
| 0 | 0 | 0 | 1 | 1 | 2 | 2 | 3 |
| 0 | 0 | 1 | 1 | 1 | 3 | 3 | 2 |
| 0 | 1 | 1 | 1 | 1 | 4 | 4 | 1 |
| 1 | 1 | 1 | 1 | 1 | 5 | 0 | 0 |
| 1 | 1 | 1 | 1 | 0 | 6 | 1 | 4 |
| 1 | 1 | 1 | 0 | 0 | 7 | 2 | 3 |
| 1 | 1 | 0 | 0 | 0 | 8 | 3 | 2 |
| 1 | 0 | 0 | 0 | 0 | 9 | 4 | 1 |

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

HALF ADDER LOGIC

| INPUT | S C |
|---|---|
| 0 0 | 0 0 |
| 0 1 | 1 0 |
| 1 0 | 1 0 |
| 1 1 | 0 1 |

INVENTOR
Shin-ichi Kamachi
BY Kelman and Berman
AGENTS

INVENTOR
Shin-ichi Kamachi
BY Kelman and Berman
AGENTS

INVENTOR
Shin-ichi Kamachi
BY Kelman and Berman
AGENTS

DIVISION LOGIC CIRCUIT

BACKGROUND OF THE INVENTION

The present invention relates to a division logic circuit and, more particularly, to a logic circuit by which the amount of displacement such as in length and angle represented by electric pulses can be measured by using counting means, wherein the measuring speed is made higher than the maximum response speed of the counting means.

A digital counting system was well known in which a displacement such as in length and angle is measured digitally by a measuring instrument utilizing moire fringes or magnetic grating.

As a counting method in which the displacement is measured by counting the number of finely divided units in length or angle, the number being indicative of the displacement, it has been the practice to produce an electric pulse signal for each displacement by one finely divided unit in length or angle and counting the number of the pulse signals corresponding to the displacement to be measured by using an electronic counter.

In such a method, however, the speed at which the displacement by one unit can be counted and indicated by the electronic counter is limited by the maximum response speed thereof, for example, in the order of 100,000 pulses/sec. Therefore, when the finely divided unit is set to be $1/10,000^{mm}$, the maximum counting speed is limited to 10 mm/sec.

The present invention aims at providing a division logic circuit by which the maximum counting speed is not limited to the maximum response speed of the electronic counter thereby permitting the counting speed to be raised for higher than the conventional electronic counting system.

SUMMARY OF THE INVENTION

The object of the present invention is to provide a novel and useful division logic circuit by which the amount of displacement such as in length and angle represented by electric pulses can be measured by an electronic counter at a speed substantially higher than the maximum response speed of the counter.

The object of the present invention is achieved by the provision of a division logic circuit in which, instead of generating one electric pulse for each displacement by one unit, a pulse is generated at the rise or descent of each pulse in one of a plurality of specifically quantized signals determined in relation to the variation in the amount of displacement so as to be counted by an electronic counter, while discriminating circuits generate output signals each indicative of the specific combination of the conditions of all the quantized signals thereby permitting the displacement by one finely divided unit to be detected so that the displacement to be measured is digitally counted by using the above two kinds of signals at a speed higher than the maximum response speed of the counter.

BRIEF DESCRIPTION OF THE DRAWINGS

FIG. 3 is a diagram showing the relationship between the condition of the combination of the detecting signals and the amount of displacement;

FIG. 4 is a table showing the principle of the operation of the division logic circuit of the present invention;

DETAILED DESCRIPTION OF THE PREFERRED EMBODIMENTS

Figure 1:
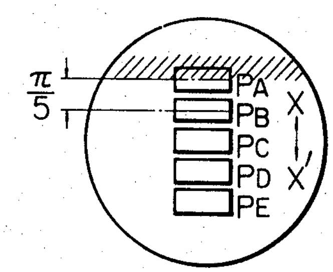
FIG. 1 is a schematic diagram showing the method for detecting the bright and dark areas in moire fringes in a measuring instrument utilizing moire fringes.
Figure 2:
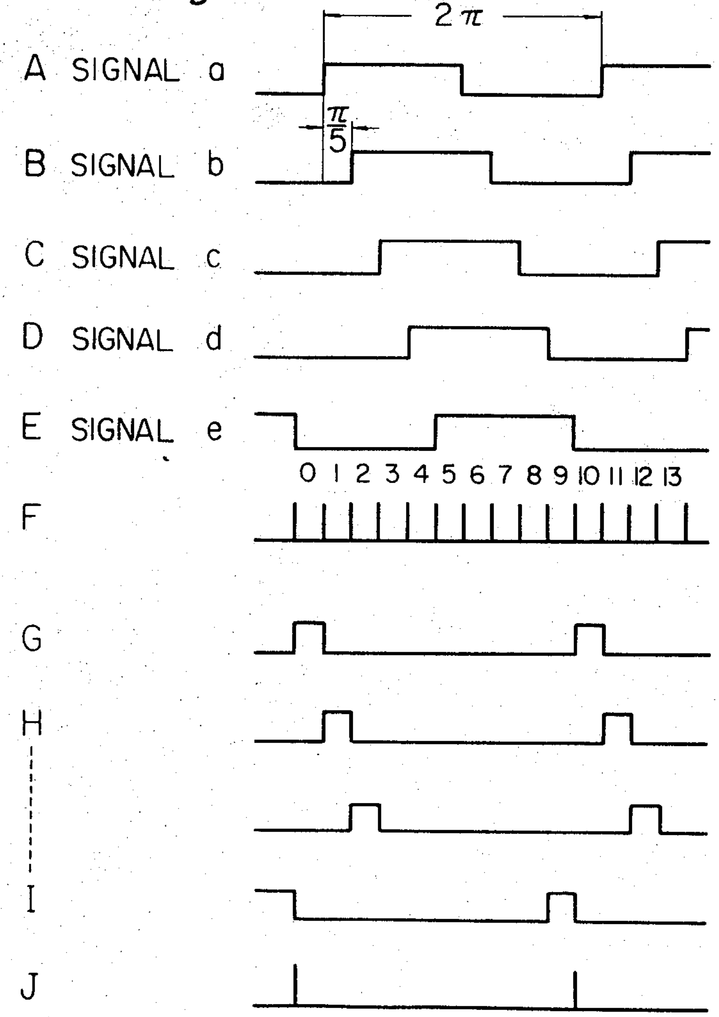
FIG. 2 is a diagram showing a process of obtaining the measured value by using the condition of the combination of the detecting signals.

Referring to FIGS. 1 and 2 which schematically show the method for obtaining finely divided unit in length or angle by using moire fringes, moire fringes move in the direction of X–X′ in the detecting station in FIG. 1 and a plurality of photoelectric elements, five photoelectric elements $P_A$–$P_E$ in the embodiment shown in FIG. 1, are arranged in the detecting station at equal distance spaced from each other in the direction of X–X′. Assuming that one cycle of the moire fringe is $2\pi$ and the distance between the adjacent two photoelectric elements $P_A$–$P_E$ is $\pi/5$, the output signals obtained from the respective photoelectric elements $P_A$–$P_E$ as the moire fringes are displaced in the direction of X–X' will have a phase difference of $\pi/5$ between the output signals of the adjacent two of photoelectric elements $P_A$–$P_E$. Therefore, when these output signals are applied to Schmitt trigger circuits, respective, for example, quantized signals *a–e* are obtained as shown by A– E in FIG. 2, a phase difference of $\pi/5$ existing between the adjacent two of signals *a–e*. Various methods other than that using moire fringes were known to obtain a plurality of detecting signals having a certain phase difference between the adjacent two of the signals by using a plurality of detecting devices or by using various well known phase dividing systems, for example.

When pulse signals are generated at the rise and the descent of each of these five signals a–e by using differentiation circuits and these pulse signals are supplied to an "or" circuit, for example, to obtain a single output, the output of the "or" circuit is indicated by F in FIG. 2.

In the prior art method for measuring the displacement by using the pulses, the output F has been counted by an electronic counter. As described previously, the maximum counting speed is limited by the maximum response speed of the electronic counter.

In order to eliminate the above disadvantage of the prior art, the present inventor has proposed a method in which, instead of generating a pulse signal for each unit displacement, a pulse signal is generated at the rise or descent of one of the specifically quantized signals *a–e* as shown by J in FIG. 2 which is produced at the descent of the signal e so as to be counted by an electronic counter, and discriminating circuits are provided which discriminate the specifically set combination of the conditions of the quantized signals *a–e* thereby producing signals G–I as the outputs thereof so that they are used to detect the displacement by one finely divided unit, thus permitting the displacement to be measured to be counted by the above two kinds of signals.

In such a counting system, each of the displacements represented by 0 to 9 units, respectively, can be indicated by the specific combination of the condition of the five quantized signals *a–e* as shown in FIG. 3. The displacement beyond 9 units can be indicated by the indication of the electronic counter which is counting the output pulses J shown in FIG. 2 in combination with the indication given by the specific combination of the five quantized signals *a–e* shown in FIG. 3. In other words, when all the quantized signals *a–e* are in lower level, i.e., 0 condition, and the zero point is set at the condition in which all the quantized signals *a–e* are in lower level, the displacement by one unit can be indicated when only the signal *a* is changed to higher level, i.e., 1 condition, while the remaining four signals *b–e* are kept in lower level. In like manner, when the signal b is changed to higher level, the displacement by two units is indicated. Thus, the number of units by which the displacement is represented is indicated by the successive change in the condition of either of the five quantized signals *a–e*. When the number of units reaches 10, the indication of unit in FIG. 3 returns to 0. Therefore, when one unit is to be counted as "1" in the electronic counter, the lowest or last figure in the number is indicated by discriminating the specific combination of the conditions of the signals *a–e*, while the second to last figure in the number and the higher figure in the number can be indicated by generating pulse at the descent of the signal *e* as shown by J in FIG. 2 so as to be counted in the electronic counter. Therefore, the counter is required to merely count one pulse for the displacement of 10 units. Thus, the speed at which the displacement by one unit is indicated in this method can be made 10 times higher than the maximum response speed of the electronic counter.

In the above embodiment, five photoelectric elements $P_A$–$P_E$ are used so as to produce five quantized signals *a–e*. However, the number of the photoelectric elements can be changed optionally. For example, when four photoelectric elements are used, the last figure in the number is indicated by 0–7 units instead of 0–9 units.

In a digital measuring instrument, it is in general desirable to allow the origin of the measurement to be set to any optional point or any of 0–9 units shown in FIG. 3 so as to permit the amount of the displacement from the thus set origin to be counted and displayed. In a prior counting device in which only the pulse signals are counted, the origin can be freely set to any optional point by merely resetting the electronic counter at the set origin. In the system in which the last digit in the number is indicated by the specific combination of the conditions of the signals *a–e* as described above, no problem arises when the origin is set at the unit 0 at which all the signals *a–e* are made zero, because the discriminating circuit indicates the selected one of the units 0–9 by discriminating the predetermined combination of the conditions of the signals *a–e*. If, however, the origin is set to any of the 1–9 units other than 0 unit, the indication of the last digit in the number can not be made zero by merely resetting the electronic counter.

The present invention avoids the above described difficulty and provides a division logic circuit by which correct measured value of the displacement from the origin is obtained even though the origin is set to any of the units 0–9 or any combination of the conditions of the signals *a–e*.

The present invention comprises a division logic circuit wherein an amount or quantity represented by the specific combination of the conditions of a plurality of signals the condition of only one of which is changed at a time is converted to an amount or quantity measured from an origin selected at an optional combination of the conditions of the signals, the logic circuit being characterized by a memory circuit for memorizing the combination of the conditions of the signals to be set as an origin, a parity circuit for producing "exclusive or" outputs of the corresponding sets in the combination of the conditions of the signals memorized in the memory circuit and in the combination of the conditions of the signals to be converted so as to give the amount of quantity measured from the set origin, respectively, a cyclic transposition or substitution circuit for effecting cyclic transposition in the combination of the conditions of the signals in regular order of the combination of the outputs of the parity circuit, and a control circuit for producing control signal from the combination of the conditions of the signals memorized in the memory circuit so as to actuate the cyclic transposition or substitution circuit.

Figure 5:
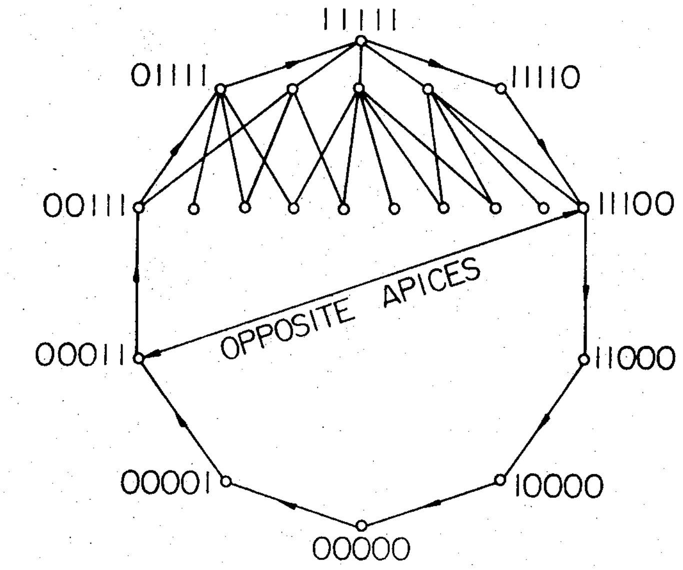
FIG. 5 is a diagram showing Boole bundle for explaining the principle of the present invention.

Now, referring to FIG. 4, five signals *a*, *b*, *c*, *d* and *e* are used for producing 10 units 0 to 9 by the coding of the combination of the conditions of the signals $a$ to $e$. Such a coding of the combination is represented by five parameter Boolean lattice as shown in FIG. 5. The coding is rotated around the major circle of Boolean lattice in accordance with the variation in the conditions of the signals. Therefore, the adjacent two codes has always a distance or difference of "1" therebetween. In such a Boolean lattice the indication of the last digit in the counted number is made 0 at the origin, if the origin is set to the code (00000). When an optional point, the code (00111), for example, is set to the origin, however, the indication of the last figure in the number at the origin is not "0" but is made "3" unit.

Therefore, in order to be able to select the reset position at any optional point or the code, conversion of the coding must be effected which is equivalent to the rotation of Boolean lattice by an appropriate distance depending upon the selected reset position. Thus, when the code (00111) is selected as the origin, the code must be rotated around Boolean lattice by the distance "3" in the anticlockwise direction shown in FIG. 5 so as to bring the code (00111) in coincidence with the code (00000).

Assuming that a code is a vector composed of signals $a$ to $e$ in the present invention, when a specific code $\mathbb{D}_o$ $(a_o, b_o, c_o, d_o, e_o)$ is reset to make it the origin and the displacement or condition proceeds from this origin to an optical code $\mathbb{D}$ $(a, b, c, d, e)$ a parity vector $\mathbb{P} = \mathbb{D}_o \oplus \mathbb{D}$ is produced in accordance with the following definition and a cyclic transposition or substitution $\pi$ which is determined in relation to $\mathbb{D}_o$ is effected with respect to the parity vector $\mathbb{P}$ so that a new code $\pi\mathbb{P}$ of the vector is produced thereby permitting the amount of displacement to be obtained by the code $\pi\mathbb{P}$. The parity vector $\mathbb{P}$ is represented by $$\mathbb{P} = \mathbb{D}_o \oplus \mathbb{D}$$
$$= \mathbb{P}\,(a_o \oplus a,\ b_o \oplus b,\ c_o \oplus c,\ d_o \oplus d,\ e_o \oplus e)$$

where:

$$\oplus = \text{exclusive or}$$

In other words, $$a_o \oplus a = a_o \cdot \bar{a} \vee \bar{a}_o \cdot a$$

The cyclic transposition or substitution $\pi$ is a function of the vector $\mathbb{D}_o$ at the reset position.

$\pi$ is represented in the positive domain as follows: $\pi+ = W(\mathbb{D}_o \oplus a_o)$ where $W$ represents the weight of the vector $(\mathbb{D}_o \oplus a_o)$ and is equal to the number of the components of the vector which are in the condition "1".

"$\pi+$" shown in FIG. 4 shows the cyclic transposition in the positive domain, while "$\pi-$" shows the cyclic transposition in the negative domain.

For example, one cyclic transposition effected to the vector $(a, b, c, d, e)$ in the positive domain means that the vector is converted to a vector $(e, a, b, c, d)$.

Some examples will be described below.

Example 1

The origin is set to $$\mathbb{D}_o = (00111) \qquad (D_o = 3)$$

When the displacement advances by three units in the positive sense so as to reach $$\mathbb{D} = (11110) \qquad (D = 6)$$

then the parity vector $\mathbb{P}$ is obtained from the above two vectors $\mathbb{D}_o$ and $\mathbb{D}$ is $$\mathbb{P} = (0 \oplus 1,\ 0 \oplus 1,\ 1 \oplus 1,\ 1 \oplus 1,\ 1 \oplus 0)$$
$$= (1, 1, 0, 0, 1)$$

The cyclic transposition $\pi+$ is represented as follows:

$$\pi+ = W(\mathbb{D}_o \oplus a_o)$$
$$= W(a_o \oplus a_o,\ b_o \oplus a_o,\ c_o \oplus a_o,\ d_o \oplus a_o,\ e_o \oplus a_o)$$
$$= W(0 \oplus 0,\ 0 \oplus 0,\ 1 \oplus 0,\ 1 \oplus 0,\ 1 \oplus 0)$$
$$= W(00111)$$
$$= 3$$

Therefore, the parity vector $\mathbb{P} = (11001)$ is cyclically transposed by three times ($\pi+ = 3$) as follows:

$$\mathbb{P} = (11001) \downarrow (11101) \downarrow (01110) \downarrow (00111)$$

$$\pi+\mathbb{P} = (00111)$$

This vector (00111) indicates the unit "3", i.e., the correct value of "3" instead of "6" is indicated when the origin is set to unit "3" and the condition or the displacement advances by three units in the positive sense.

Example 2

The origin is set $$\mathbb{D}_o = (11110) \qquad (D_o = 6)$$

and the condition or the displacement advances by seven units in the positive sense, thus $$\mathbb{D} = (00111) \qquad (D = 3)$$

Then $$\mathbb{P} = (11001)$$

and $$\pi+ = W(\mathbb{D}_o \oplus a_o)$$
$$= W(00001)$$
$$= 1$$

Therefore, one cyclic transposition is effected to the parity vector $\mathbb{P}$ $$\mathbb{P} = (11001) \downarrow (11100)$$

$$\therefore \pi+\mathbb{P} = (11100)$$

This vector $\pi+\mathbb{P}$ correctly indicates that the amount of displacement is 7 units.

Example 3

The origin is set to $$\mathbb{D}_o = (11110) \qquad (D = 6)$$

The displacement advances in the positive sense by one unit to reach $$\mathbb{D} = (11100) \qquad (D = 7)$$

The parity vector $\mathbb{P}$ and $\pi+$ are $$\mathbb{P} = (00010)$$
$$\pi + = 1$$

By effecting one cyclic transposition to $$\mathbb{P} = (00010) \downarrow (00001)$$

$$\therefore \pi + \mathbb{P} = (00001) = 1$$

This vector indicates that the amount of displacement is one unit.

As described above, the cyclic transposition $\pi$ is given as follows when the condition or displacement advances in the positive sense $$\pi + = W(\mathbb{D} \oplus a_0)$$

FIG. 4 shows this value $\pi+$. As seen in FIG. 4, the value $\pi+$ returns to the original value when the cyclic transposition is effected five times. Therefore, the value $D+$ may be substituted for the value $\pi+$.

Figure 6:
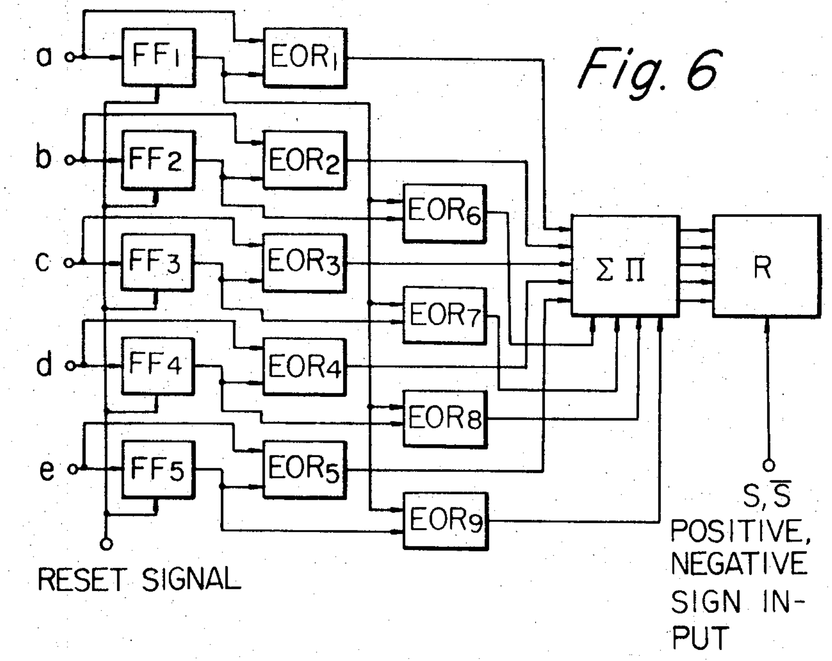
FIG. 6 is a block diagram showing an embodiment of the electric circuit of the division logic circuit of the present invention.

FIG. 6 shows an example of the division logic circuit of the present invention in which the units 0–9 are indicated depending upon the specific combination of the conditions of five signals $a$–$e$ shown in FIG. 4.

In FIG. 6, the signals $a$–$e$ are applied to flip-flop circuits $FF_1$ to $FF_5$, respectively, and, at the same time, the signals $a$–$e$ are supplied to "exclusive or" circuits $EOR_1$ to $EOR_5$, respectively. The output each of the flip-flop circuits $FF_1$–$FF_5$ is supplied to the other input terminal of the respective "exclusive or" circuit $EOR_1$–$EOR_5$ as shown. A reset signal line for setting the origin is connected to the trigger terminal each of the flip-flop circuits $FF_1$–$FF_5$. Thus, when the reset signal is applied to the flip-flop circuits $FF_1$–$FF_5$, the state of the combination of the conditions of the signals $a$–$e$ existing in the flip-flop circuits $FF_1$–$FF_5$ at the moment the reset signal is applied thereto can be memorized therein. This means that the conditions of the respective signals $a$–$e$ as set to the origin $\mathbb{D}_0 = (a_0, b_0, c_0, d_0, e_0)$ are memorized in the flip-flop circuits $FF_1$–$FF_5$.

Thus, the respective components or parameters of the code $\mathbb{D}_0 = (a_0, b_0, c_0, d_0, e_0)$ memorized in the flip-flop circuits $FF_1$–$FF_5$ at the reset position and the respective compo-nents or parameters of the vector $\mathbb{D} = (a, b, c, d, e)$ are supplied to the "exclusive or" circuits $EOR_1$–$EOR_5$, so that the components of the parity vector $\mathbb{P} = \mathbb{D}_0 \oplus \mathbb{D} = (a_0 \oplus a, b_0 \oplus b, c_0 \oplus c, d_0 \oplus d, e_0 \oplus e)$ are obtained at the outputs of "exclusive or" circuits $EOR_1$–$EOR_5$, respectively. The outputs of the "exclusive or" circuits $EOR_1$ –$EOR_5$ representing the respective components of the parity vector $\mathbb{P}$ are supplied to cyclic transposition or substitution circuit $\Sigma\pi$ as shown.

"Exclusive or" circuits $EOR_6$–$EOR_9$ are provided in order to obtain the cyclic transposition $\pi+$ in the positive domain. One of the input terminal each of the "exclusive or" circuits $EOR_6$–$EOR_9$ is commonly connected together to the output terminal of the flip-flop circuit $FF_1$, while the other input terminal of the respective "exclusive or" circuits $EOR_6$–$EOR_9$ is connected to the output terminal of the respective flip-flop circuits $FF_2$–$FF_5$. Each of the "exclusive or" circuits $EOR_6$–$EOR_9$ indicates one cyclic transposition or substitution when the output thereof is "logic 1". The number of the outputs obtained from the "exclusive or" circuits $EOR_6$–$EOR_9$ which are "logic 1" represents the total cyclic transposition $\pi+$ and the thus obtained total cyclic transposition $\pi+$ is supplied to the cyclic transposition circuit $\Sigma\pi$ so as to control the times or the number the transposition is effected to the parity vector $\mathbb{P}$.

Figure 7:
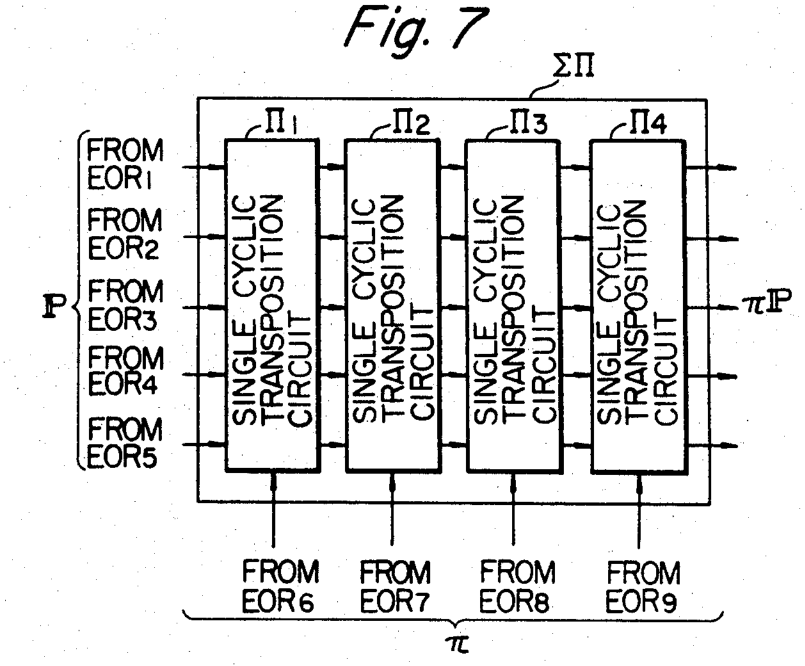
FIG. 7 is a block diagram showing an embodiment of the cyclic transposition circuit used in the present invention.

FIG. 7 shows the detail of the cyclic transposition circuit $\Sigma\pi$. In the embodiment of FIG. 6, the maximum number of times the cyclic transposition is effected is four, so the cyclic transposition circuit $\Sigma\pi$ suffices to include four single cyclic transposition circuits $\pi_1$–$\pi_4$ and these single cyclic transposition circuits $\pi_1$–$\pi_4$ are connected in cascade connection. The output of each of the "exclusive or" circuits $EOR_6$–$EOR_9$ is connected to the respective single cyclic transposition circuits $\pi_1$–$\pi_4$ while the parity vector $\mathbb{P}$ is supplied to the circuit $\Sigma\pi$ as shown so that a cyclic transposition is effected in any of the single cyclic transposition circuits $\pi_1$–$\pi_4$ to which the output of "logic 1"0 is supplied from the "exclusive or" circuit connected thereto thereby permitting the output converted so as to be made the required combination of the conditions of the signals $a$–$e$ as measured from the origin at reset position.

Figure 8:
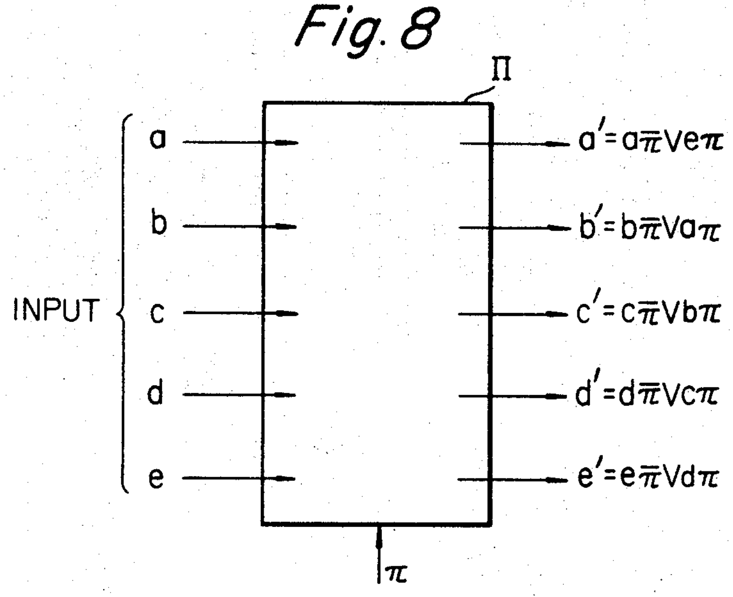
FIG. 8 is a block diagram showing the single cyclic transposition circuit for effecting a single transposition.

FIG. 8 shows one $\pi$ of the single cyclic transposition circuit $\pi_1$–$\pi_4$. The circuit $\pi$ is supplied with the signals $a$–$e$ and the cyclic transposition signal $\pi$ which is the control signal for effecting the cyclic transposition so that the outputs $a'$, $b'$, $c'$, $d'$, $e'$ are generated. These outputs $a'$–$e'$ are determined as follows:

$$a' = a\,\overline{\pi} \vee e\,\pi$$
$$b' = b\,\overline{\pi} \vee a\,\pi$$
$$c' = c\,\overline{\pi} \vee b\,\pi$$
$$d' = d\,\overline{\pi} \vee c\,\pi$$
$$e' = e\,\overline{\pi} \vee d\,\pi$$

Figure 9:
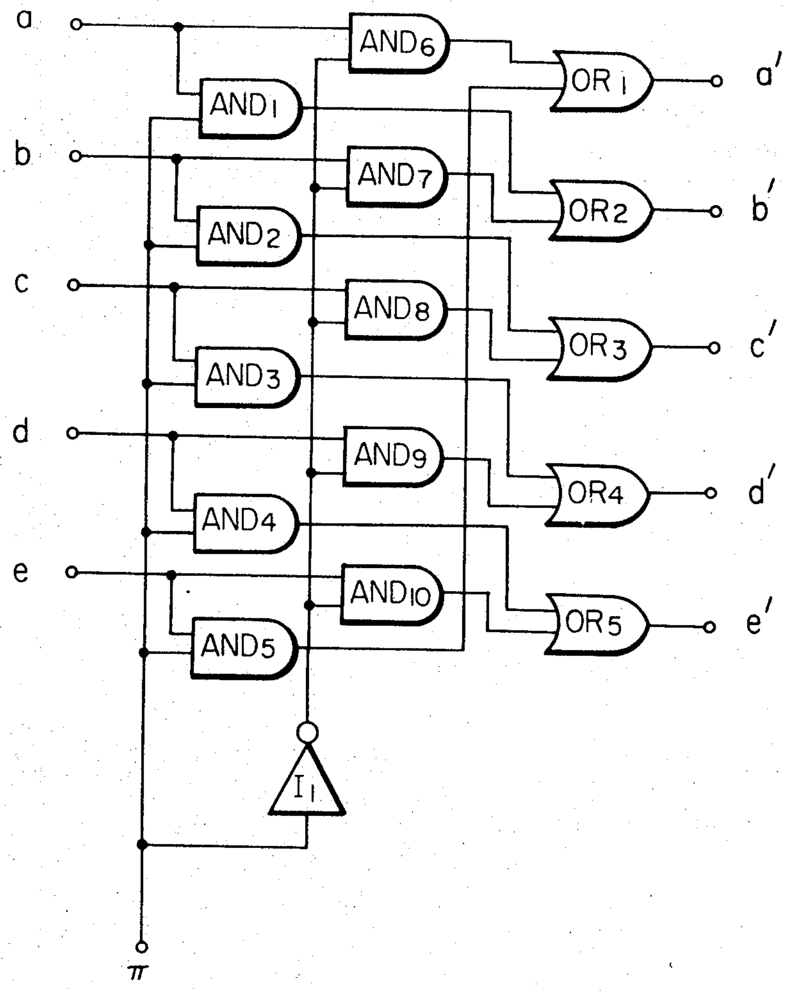
FIG. 9 is a diagram showing detailed construction of an embodiment of the single cyclic transposition circuit of FIG. 8.

An embodiment for obtaining the above outputs $a'$–$e'$ is shown in FIG. 9. In FIG. 9, two input "and gates" $AND_1$–$AND_5$ are provided, and one of the input terminals each of the "and gates" $AND_1$–$AND_5$ is supplied with the input signals $a, b, c, d, e$, respectively while the cyclic transposition signal $\pi+$ is supplied commonly to the other input terminal each of the "and gates" $AND_1$–$AND_5$. Two input "and gates" $AND_6$–$AND_{10}$ are further provided, and one of the input terminals each of the "and gates" $AND_6$–$AND_{10}$ is supplied with the input signals $a, b, c, d, e$, respectively while inverted cyclic transposition signal $\overline{\pi}$ obtained through inversion circuit $I_1$ from the cyclic transposition signal $\pi$ is supplied commonly to the other input terminal each of the "and gates" $AND_6$–$AND_{10}$.

The output terminals of "and gates" $AND_5$ and $AND_6$ are connected to the input terminals of "or gate" $OR_1$ and the output terminals of the "and gates" $AND_1$ and $AND_7$ are connected to the input terminals of "or gate" $OR_2$, the output terminals of the "and gates" $AND_2$ and $AND_8$ being connected to the input terminals of "or gate" $OR_3$, while the output terminals of the "and gates" $AND_3$ and $AND_9$ are connected to the input terminals of "or gate" $OR_4$ and the output terminals of "and gates" $AND_4$ and $AND_{10}$ are connected to the input terminals of "or gate" $OR_5$ as shown in FIG. 9.

By the connection of the circuit of FIG. 9, it is apparent that the output signals $a'$, $b'$, $c'$, $d'$, $e'$ as defined above are obtained from the input signals $a, b, c, d, e$.

Therefore, when $\pi = 1$, the single cyclic transposition circuit $\pi$ produces an output to which one cyclic transposition is effected, whereas, when $\pi = 0$, an output is obtained to which no cyclic transposition is effected, i.e., the input signal is directly given to the output without any cyclic transposition effected thereto.

The output ($a'$, $b'$, $c'$, $d'$, $e'$) of the cyclic transposition circuit $\Sigma\pi$ is then supplied to discriminating circuit R as shown in FIG. 6 so that the combination of the conditions of the signals $a$, $b$, $c$, $d$, $e$ is discriminated therein so as to obtain the value D.

Figure 10:
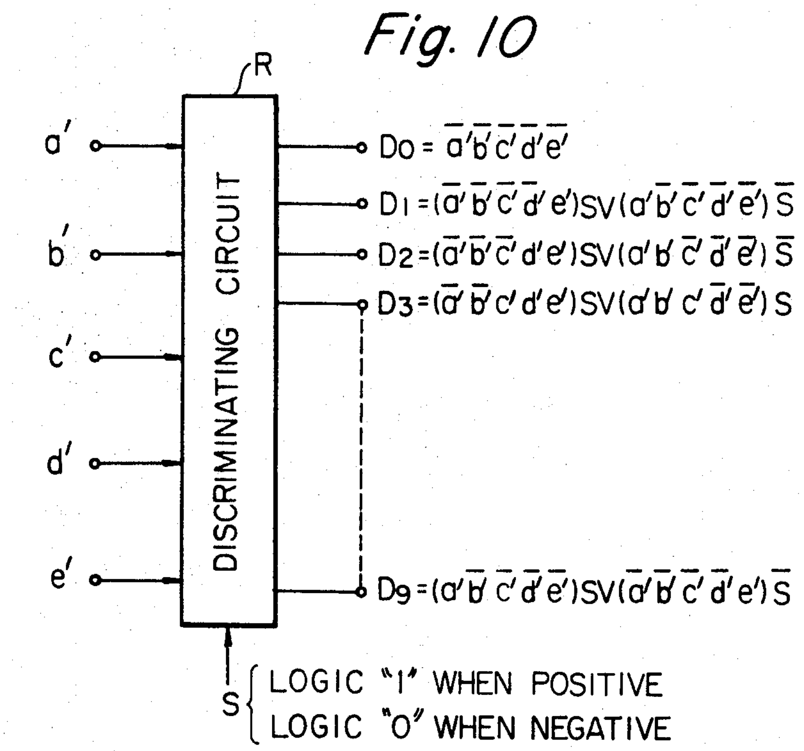
FIG. 10 is a block diagram showing an embodiment of the discriminating circuit used in the present invention.

FIG. 10 shows an embodiment of the discriminating circuit R. The output signals $a'$, $b'$, $c'$, $d'$, $e'$ of the "or gates" $OR_1$–$OR_5$ are supplied to the discriminating circuit R while it is supplied with sign input S which is indicative of the displacement in the positive sense or in the negative sense. The sign input S is produced as described later, and it is made logic "1" when the displacement advances in the positive domain, while it is made logic "0" when proceeds in the negative domain beyond the origin. The discriminating circuit R is provided with 10 output terminals $D_0$–$D_9$, and the following logic outputs are produced at the respective output terminals $D_0$–$D_9$.

$$D_0 = \bar{a}'\ \bar{b}'\ \bar{c}'\ \bar{d}'\ \bar{e}'$$
$$D_1 = (\bar{a}'\ \bar{b}'\ \bar{c}'\ \bar{d}'\ e')\ S \vee (a'\ \bar{b}'\ \bar{c}'\ \bar{d}'\ \bar{e}')\bar{S}$$
$$D_2 = (\bar{a}'\ b'\ \bar{c}'\ d'\ e')\ S \vee (a'\ b'\ \bar{c}'\ \bar{d}'\ \bar{e}')\bar{S}$$
$$D_3 = (\bar{a}'\ \bar{b}'\ c'\ d'\ e')\ S \vee (a'\ b'\ c'\ \bar{d}'\ \bar{e}')\bar{S}$$
$$D_4 = (\bar{a}'\ b'\ c'\ d'\ e')\ S \vee (a'\ b'\ c'\ d'\ \bar{e}')\bar{S}$$
$$D_5 = (a'\ b'\ c'\ d'\ e')\ S \vee (a'\ b'\ c'\ d'\ e')\bar{S}$$
$$D_6 = (a'\ b'\ c'\ d'\ \bar{e}')\ S \vee (\bar{a}'\ b'\ c'\ d'\ e')\bar{S}$$
$$D_7 = (a'\ b'\ c'\ \bar{d}'\ \bar{e}')\ S \vee (\bar{a}'\ \bar{b}'\ c'\ d'\ e')\bar{S}$$
$$D_8 = (a'\ b'\ \bar{c}'\ \bar{d}'\ e')\ S \vee (\bar{a}'\ \bar{b}'\ \bar{c}'\ d'\ e')\bar{S}$$
$$D_9 = (a'\ \bar{b}'\ \bar{c}'\ \bar{d}'\ \bar{e}')\ S \vee (\bar{a}'\ \bar{b}'\ \bar{c}'\ \bar{d}'\ e')\bar{S}$$

Thus, the amount of the displacement from the set origin in either of the positive domain and the negative domain can be indicated by an absolute value. In other words, when the displacement proceeds in the negative domain, the value having negative sign such as −1, −2, −3 as measured from the origin can be indicated.

Figure 11:
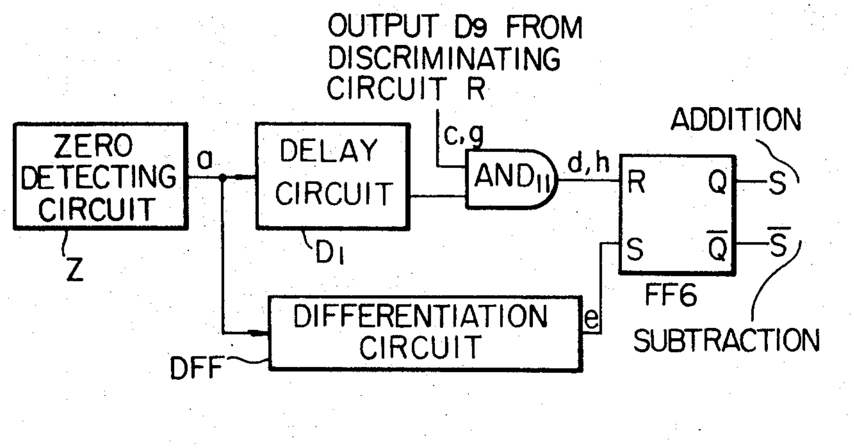
FIG. 11 is a block diagram showing an embodiment of the circuit for generating addition or subtraction sign.
Figure 12:
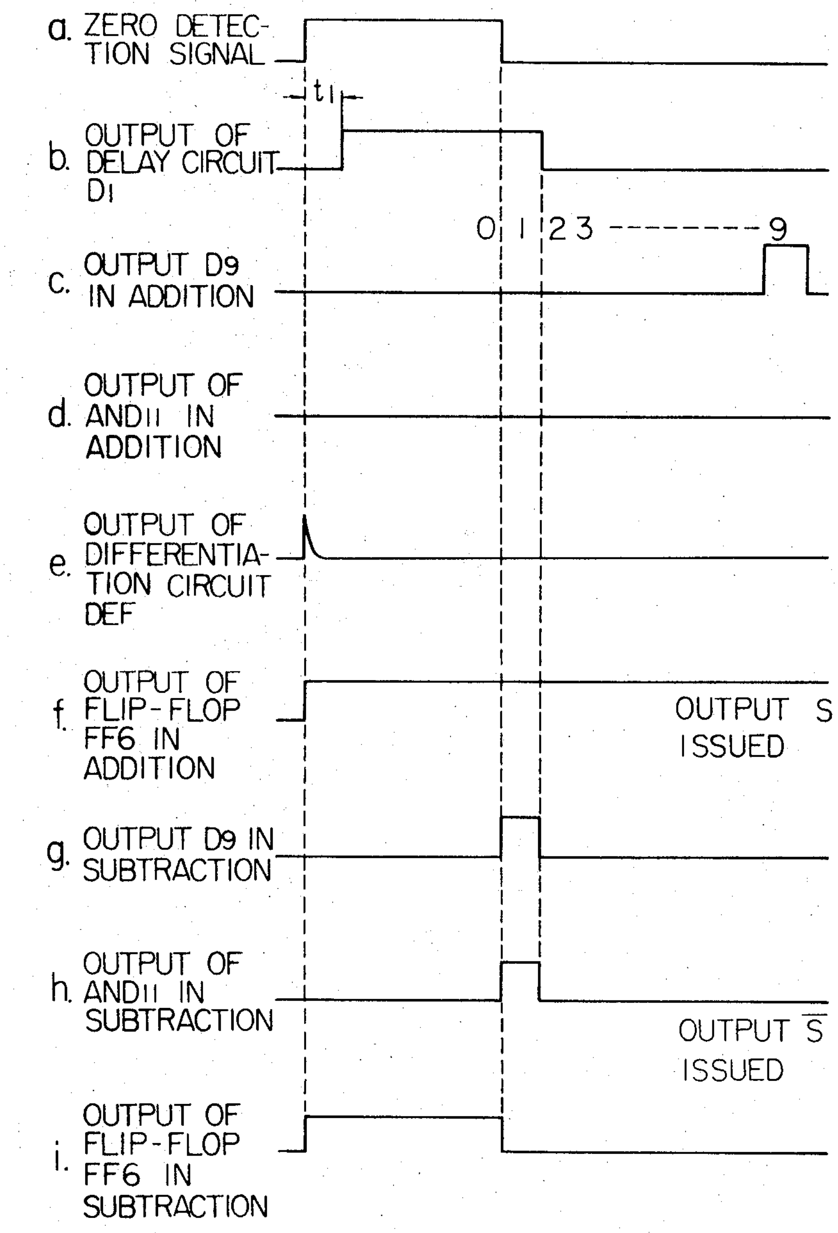
FIG. 12 is a diagram showing the various signal waves for explaining the actuation of the circuit of FIG. 11.

The positive sign input $S$ and the negative sign input $\bar{S}$ are generated as shown in FIG. 11, for example. The circuit shown in FIG. 11 includes a zero detecting circuit Z which is adapted to detect the condition in which all the figures of the number counted in the electronic counter as well as all the outputs $D_0$–$D_9$ of the discriminating circuit R are made zero. The output terminal of the zero detecting circuit Z is connected to one of the input terminals of "and gate" $AND_{11}$ through a delay circuit $D_1$ interconnected therebetween, while the other input terminal of the "and gate" $AND_{11}$ is supplied with the output $D_9$ of the discriminating circuit R. The output of the "and gate" $AND_{11}$ is connected to reset input terminal R of flip-flop circuit $FF_6$ while the set input terminal $S$ of the flip-flop circuit $FF_6$ is connected to the output terminal of the zero detecting circuit Z through a differentiation circuit DEF interconnected therebetween. As described above, an output is generated in the zero detecting circuit Z when all the outputs of the electronic counter and the discriminating circuit R are made zero. Thus, it indicates that the condition reaches the origin. FIG. 12 shows the operation of the circuit of FIG. 11. The zero detection signal of the zero detecting circuit Z is indicated by $a$ in FIG. 12. The output b of the delay circuit $D_1$ is shown as being delayed by the time $t_1$ from the output a of the zero detecting circuit Z. The output $D_9$ supplied to the "and gate" $AND_{11}$ from the discriminating circuit R when the condition is varying in the positive sense appears after the condition varies from the zero condition by 9 units as shown by $c$ in FIG. 12. If the delay time $t_1$ is selected to be shorter than the time in which the condition varies by 9 units, then the output of the "and gate" $AND_{11}$ will be "0" as indicated by $d$ in FIG. 12. On the other hand, an instantaneous pulse indicated by $e$ in FIG. 12 is obtained by differentiating the rise of the zero detection signal $a$ by the differentiation circuit DEF. The flip-flop circuit $FF_6$ is set by this pulse $e$ which is supplied to the set input terminal $S$ thereof so that a positive sign input $S$ is obtained from the set output terminal Q of the flip-flop circuit $FF_6$.

When the condition is varying in the negative sense, the output $D_0$ from the discriminating circuit R is immediately supplied as shown by g in FIG. 12. Therefore, the output of the "and gate" $AND_{11}$ which is the logic product or logic "and" of the output $D_9$ and the delayed signal $b$ is made "1" as indicated by $h$ in FIG. 12. Therefore, the flip-flop circuit $FF_6$ is reset by the output $h$ of the "and gate" $AND_{11}$ after it has been set by the output pulse $e$ of the differentiation circuit DEF, so that the negative sign $\bar{S}$ is supplied from the reset output terminal $\bar{Q}$ of the flip-flop circuit $FF_6$.

Various circuits for generating the positive and negative sign $S$ and $\bar{S}$ are available other than that shown in FIG. 11.

Figure 13:
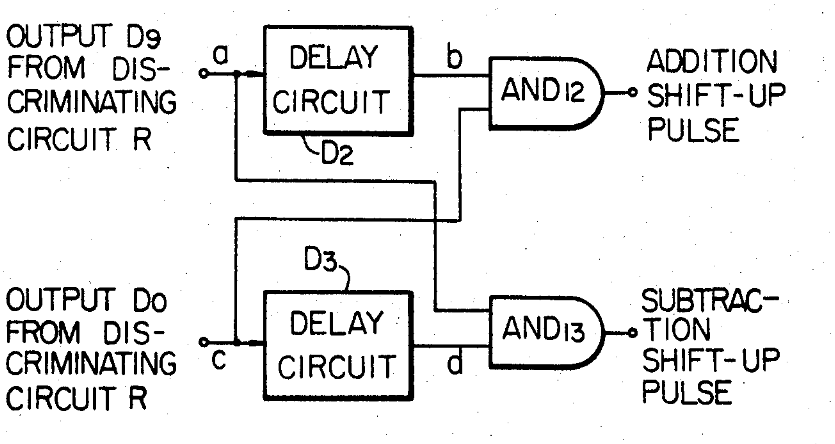
FIG. 13 is a block diagram showing an embodiment of the circuit for generating addition or subtraction shift-up pulse.
Figure 14:
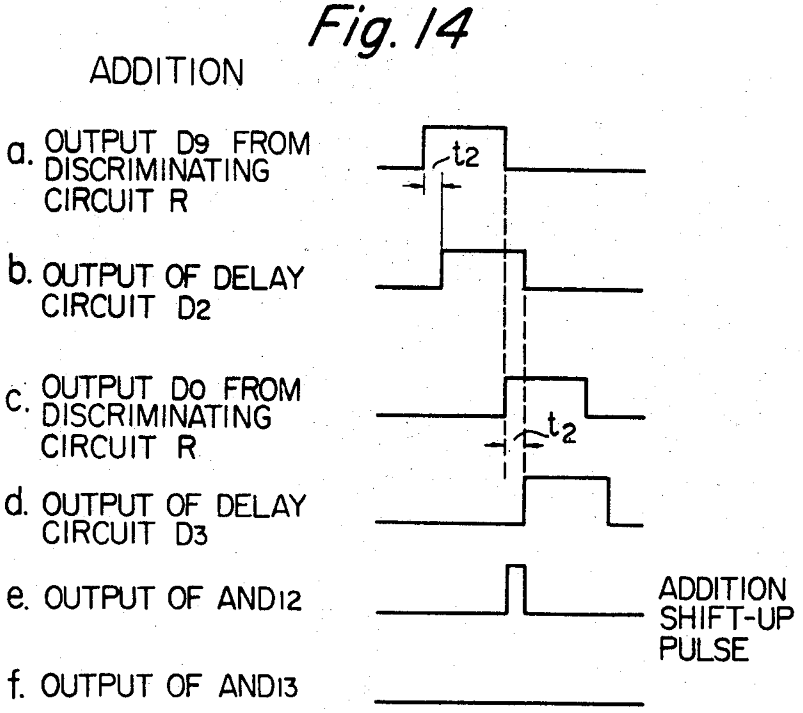
FIG. 14 is a diagram showing various pulse signals for explaining the operation of the circuit of FIG. 13.

FIGS. 13 and 14 show an example of the shifting-up of the figure in the number counted in the electronic counter. Two delay circuits $D_2$ and $D_3$ and two "and" gates $AND_{12}$ and $AND_{13}$ are provided. Output $D_9$ of the discriminating circuit R representing "9 unit" is applied to the delay circuit $D_2$ so that the output thereof is delayed by a short time $t_2$. The output of the delay circuit $D_2$ is supplied to the "and" gate $AND_{12}$. The output $D_9$ is directly supplied to the "and" gate $AND_{13}$. The output $D_0$ of the discriminating circuit R representing the "0 unit" is supplied to the delay circuit $D_3$ so that the output thereof is delayed by the short time $t_2$. The output of the delay circuit $D_3$ is supplied to the "and" gate $AND_{13}$ while the output $D_0$ is directly supplied to the "and" gate $AND_{12}$. When the number displayed in the electronic counter varies in the positive sense or in the addition mode at the absolute value thereof, the output $D_0$ is generated by the discriminating circuit R after the output $D_9$ has been generated. The output $D_9$ and the output $D_0$ are indicated by $a$ and $c$ in FIG. 14, respectively. The outputs of the delay circuits $D_2$ and $D_3$ which are supplied with the output $D_9$ and $D_0$, respectively, are indicated by $b$ and $d$ in FIG. 14, respectively. Therefore, the shifting-up pulse for increasing the absolute value of the number displayed in the electronic counter is generated by the "and" gate $AND_{12}$ as indicated by $e$ in FIG. 14, whereas no output is generated in the "and" gate $AND_{13}$ as shown by $f$ in FIG. 14.

When the condition varies in the sense in which the number displayed in the electronic counter is decreased at the absolute value thereof, the output $D_9$ is generated by the discriminating circuit R after the output $D_0$ has been generated. Therefore, no output is generated by the "and" gate $AND_{12}$, whereas the shifting-up pulse for decreasing the absolute value displayed in the electronic counter is generated by the "and" gate $AND_{13}$. The addition shifting-up pulse or the subtraction shifting-up pulse is supplied to the electronic counter so as to permit the second to last figure and the preceding figure in the number counted in the electric counter to be displayed.

When the condition is varying in the negative domain or in the negative sense, the absolute value of the displacement from the origin can be indicated without applying the positive sign $s$ or the negative sign $\bar{S}$ which is the denial logic of the positive sign S to the discriminating circuit R shown in FIG. 6 by merely taking the values of the output $D_0$, $D_1$–$D_9$ as follows:

$D_0 = \bar{a}'\ b'\ \bar{c}'\ \bar{d}'\ \bar{e}'$
$D_1 = \bar{a}'\ \bar{b}'\ \bar{c}'\ \bar{d}'\ e'$
$D_2 = \bar{a}'\ \bar{b}'\ \bar{c}'\ d'\ e'$
$D_3 = \bar{a}'\ \bar{b}'\ c'\ d'\ e'$
$D_4 = \bar{a}'\ b'\ c'\ d'\ e'$
$D_5 = a'\ b'\ c'\ d'\ e'$
$D_6 = a'\ b'\ c'\ d'\ \bar{e}'$
$D_7 = a'\ b'\ c'\ \bar{d}'\ \bar{e}'$
$D_8 = a'\ b'\ \bar{c}'\ \bar{d}'\ \bar{e}'$
$D_9 = a'\ \bar{b}'\ \bar{c}'\ \bar{d}'\ \bar{e}'$ provided that the cyclic transposition $\pi-$ is selected from the table of FIG. 4 and the thus selected cyclic transposition $\pi-$ is applied to the parity vector $\mathbb{P}$ and thereafter the thus obtained vector is reversely transposed as described below.

The circuit for effecting the above described reverse transposition may be constituted by the cyclic transposition circuit and a reverse transposition circuit which is controlled by the positive sign $S$ or the negative sign $\bar{S}$.

Figure 15:
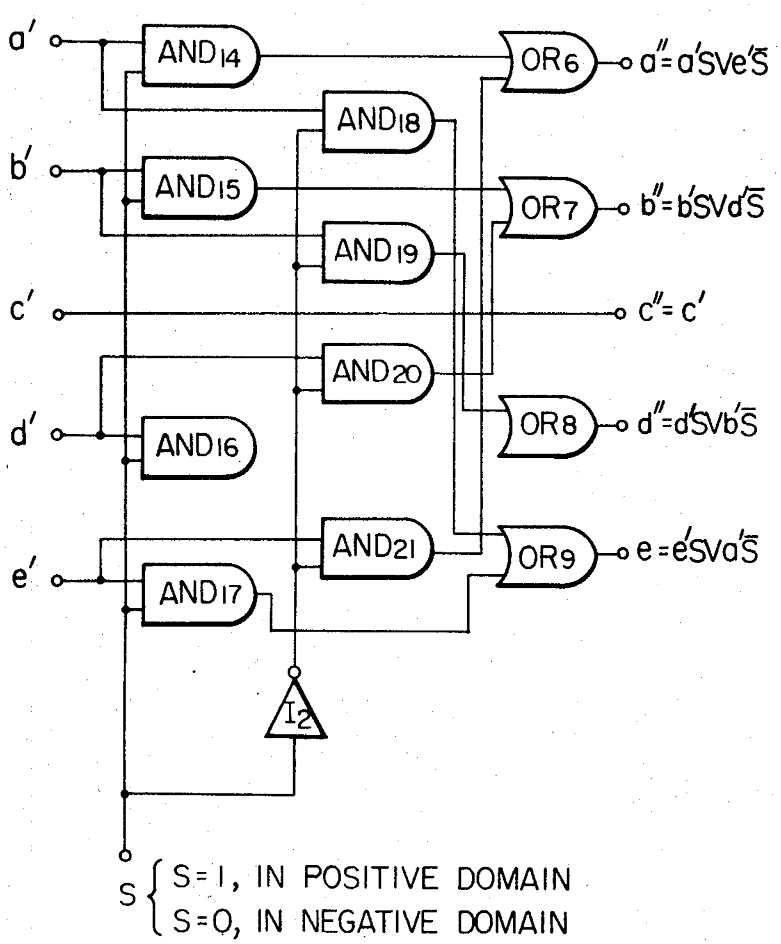
FIG. 15 is a diagram showing an embodiment of the transposition circuit used in the present invention.

FIG. 15 shows an embodiment of the above described reverse transposition circuit. The output signals $a'$, $b'$, $d'$, $e'$ from the cyclic transposition circuit $\Sigma\pi$ are supplied to "and" gates $AND_{14}$–$AND_{17}$, respectively. The sign input $S$ is commonly supplied to the respective "and" gates $AND_{14}$–$AND_{17}$. On the other hand, the output signals $a'$, $b'$, $d'$, $e'$ are also supplied to "and" gates $AND_{18}$–$AND_{21}$, respectively. The denial sign input $\bar{S}$ which is obtained from the sign input $S$ through an inversion circuit $I_2$ is commonly supplied to the "and" gates $AND_{18}$–$AND_{21}$. The outputs of the "and" gates $AND_{14}$ and $AND_{21}$ are applied to "or" gate $OR_6$ and the outputs of the "and" gates $AND_{15}$ and $AND_{20}$ are applied to "or" gate $OR_7$, the outputs of the "and" gates $AND_{16}$ and $AND_{19}$ being applied to "or" gate $OR_8$, while the outputs of the "and" gates $AND_{17}$ and $AND_{18}$ are applied to "or" gate $OR_9$. The output signal $c'$ is directly lead to the output $c''$ as shown. By the circuit described above, the outputs $a''$, $b''$, $d''$, $e''$ are obtained as follows:

$a'' = a'\ S \vee e'\ \bar{S}$
$b'' = b'\ S \vee d'\ \bar{S}$
$d'' = d'\ S \vee b'\ \bar{S}$
$e'' = e'\ S \vee a'\ \bar{S}$ Therefore, when the positive sign input $S = 1$ is supplied to the circuit, the outputs of the circuit are produced which are the same as the inputs $a'$, $b'$, $c'$, $d'$ and $e'$, respectively. To the contrary, when the denial sign input $\bar{S}$ or $S = 0$ is supplied to the circuit, the outputs of the circuit are reversed from the input signals $a'$, $b'$–$e'$ to produce the following outputs:

$a'' = e'$
$b'' = d'$
$c'' = c'$
$d'' = b'$
$e'' = a'$

Some examples of the reverse transposition described above are given below.

Example I $\mathbb{D}_0 = (11100)$ $(D_0 = 7)$ is selected as the origin. The condition is advanced by "3" units in the negative sense to assume $\mathbb{D} = (01111)$ $(D = 4)$ The parity vector $\mathbb{P}$ is given below $\mathbb{P} = (10011)$ The cyclic transposition in the negative domain $\pi-$ is $\pi- = W(\mathbb{D}_0 \oplus e_0)$
$= W(11100) = 3$ Thus, the components of the vector $\mathbb{P}$ must be transposed three times from the left to the right in like manner as previously described.

$\therefore \mathbb{P} = (10011)$
↓
(00111)
↓
(01110)
↓
(11100)

$\therefore \pi-\ \mathbb{P} = (11100)$

This vector $\pi-\ \mathbb{P} = (11100)$ is reversed by the circuit of FIG. 15 as follows:

(11100)

(00111)

This value (00111) indicates "3" units as shown in FIG. 4. Therefore, in consideration of the fact that the condition is varying in the negative sense, "−" sign is given to the result obtained to give the correct indication.

Example II The origin is $\mathbb{D}_0 = (11100)$ $(D_0 = 7)$

The condition is varied by "9" units in the negative sense to reach $\mathbb{D} = (11000)$ $(D = 8)$ Then $\mathbb{P} = (00100)$
$\pi- = 3$
$\therefore \pi-\mathbb{P} = (00001)$ The reverse transposition of $\pi-\ \mathbb{P}$ gives the following vector (10000)

This indicates "9" units. Minus sign "−" is given to this results to obtain proper displacement.

Example III $\mathbb{D}_0 = (11000)$ $(D_0 = 8)$

This condition is varied by "8" units in the negative sense.

$\mathbb{D} = (00000)$ $(D = 0)$ $\therefore \mathbb{P} = (11000)$
$\pi- = 2$
$\therefore \pi-\mathbb{P} = (00011)$ The reverse transposition of $\pi-\ \mathbb{P}$ gives the following result.

(11000)

This indicates "8" units of the displacement.

The present invention provides another logic circuit in which the vector $\pi\ \mathbb{P}$ is directly obtained from the parity vector $\mathbb{P}$ without requiring the cyclic transposition circuit so as to permit the circuit to be made simpler and practical in operation.

The present invention is based on the principle set forth below.

As described previously, when the origin is set to $\mathbb{D}_0 = (00111)$
and the condition is changed to reach
$\mathbb{D} = (11100)$,
for example, then the parity vector $\mathbb{P}$ is obtained as follows:
$\mathbb{P} = (11011)$
The vector finally obtainable from the parity vector $\mathbb{P}$ by effecting the cyclic transposition thereto is either (01111) or (11110) and no codes or vectors other than the above two can be the final vector.

Figure 16:
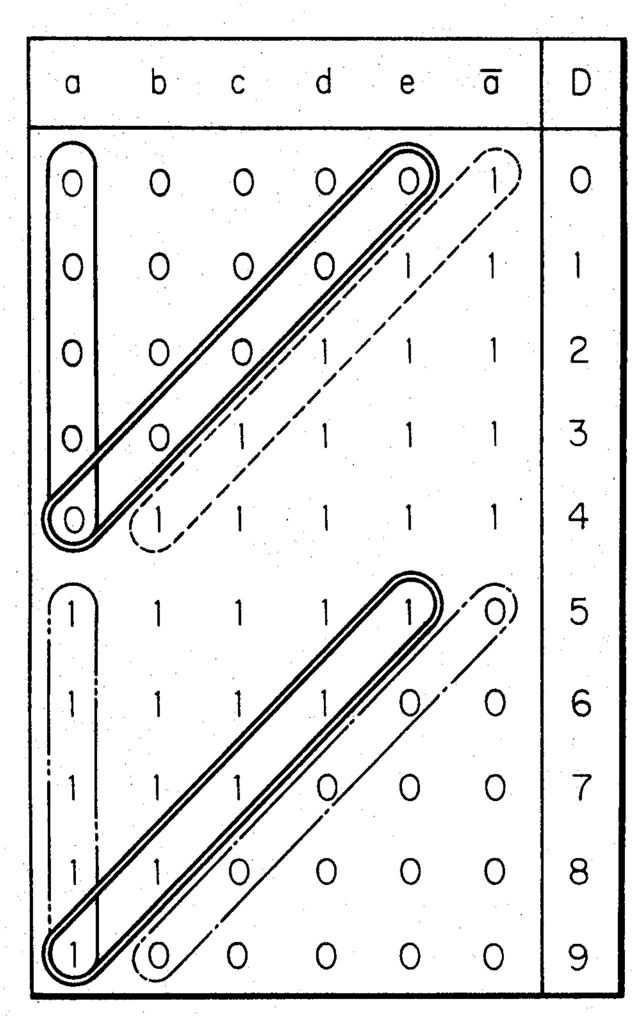
FIG. 16 is a diagram showing the positions of the marking bits in another embodiment of the division logic circuit of the present invention.

In other words, referring to FIG. 16 in which denial bits $\bar{a}$ of the respective bits $a$ in the leftmost column a are added at the rightmost column, the bits encircled by the full line are always 0 when the bits encircled by the broken line are 1, while the bits encircled by the two dot chain line are always 1 when the bits encircled by the one dot chain line are 0. The present invention utilizes the above described property of the bits.

The bits encircled by the broken line and the one dot chain line will be referred to as marking bits hereinafter.

The required code or vector can be obtained from the parity vector by detecting the condition of the marking bit whether it is 1 or 0 without effecting the cyclic transposition to the parity vector.

Designating the marking bit by suffix $M$ and the "exclusive or" of the marking bit in $\mathbb{D}_0$ and the corresponding bit in $\mathbb{D}$ is $P_M$, i.e.,
$P_M = D_{OM} \oplus D_M$
then
$(\pi \mathbb{P})_a = P_M$
The foremost component in $\pi$ $\mathbb{P}$ can be directly obtained by $P_M$.

By virtue of the property of the vector, the condition $(\pi \mathbb{P})_a = 1$ is given when the condition varies in the positive sense within the range between 5 units and 9 units as seen in FIG. 16. To the contrary, when the variation in the condition is within 0–4 units in the positive sense, then
$(\pi \mathbb{P})_a = 0$ As seen from FIG. 16, the condition of the marking bit is kept "1" when the displacement is effected in the range between "0" unit and "4" unit in the positive sense, while the condition of the marking bit is changed to "0" when the displacement proceeds to the range between "5" unit and "9" unit.

Therefore, the "exclusive or" $P_M$ of the marking bit and the corresponding bit in both the vectors is made "0" under the condition of the displacement between "0" unit and "4" unit, while it is made "1" under the condition of the displacement between "5" unit and "9" unit. Thus, these value coincide with the value of $(\pi \mathbb{P})_a$. When the marking bit is $\bar{a}$, the condition of a may be used in place of $\bar{a}$.

For example, the origin is set to $\mathbb{D}_0$=(00111) and the condition advances in the positive sense by 4 units to reach $\mathbb{D}$=(11100). The position of the marking bit in $\mathbb{D}_0$ is the third bit from the left in $\mathbb{D}_0$ as seen from FIG. 16.

Thus, the parity $P_M$ is
$P_M = 1 \oplus 1 = 0$
The parity vector of $\mathbb{D}_0$ and $\mathbb{D}$ is
$\mathbb{P} = (11011)$
Since $P_M = 0$, the leftmost bit of the vector $\pi\mathbb{P}$, which is to be obtained by the cyclic transposition $\pi(\pi = 3)$ by the previously described process, is 0.

Therefore, the required vector $\pi\mathbb{P}$ is obtained by effecting the transposition of the right side bits "011" in $\mathbb{P}$ to the left side of the left side bits "11" in $\mathbb{P}$.
$\therefore \mathbb{P}\pi$ =(01111)
The parity $P_M$=0 is indicative of the third bit "0" in $\mathbb{P}$, the preceding bit of which is "1".

Some examples of the above described process will be set forth below.

Example A

The condition advances from the origin $\mathbb{D}$= (00111) ($D_0$=3) in the positive sense by 1 unit to reach $\mathbb{D}$=(01111) ($D = 4$).

The parity vector is
= (01000)
The marking bit $M$ in $\mathbb{D}_0$ is the third bit from the left. Therefore, the parity $P_M$ is
$P_M = 1 \oplus 1 = 0$
Thus, the leftmost bit in the required vector $\pi\mathbb{P}$ is found to be the third bit "0" in $\mathbb{P}$, the preceding bit of which is in the condition of "1". Therefore, the bits "000" in $\mathbb{P}$ are transposed to the left side of the remaining bits "01" in $\mathbb{P}$ so that $\pi\mathbb{P}$ is made
$\pi\mathbb{P}$= (00001)
This indicates the displacement by 1 unit in the positive sense.

Example B

The condition advances from the origin $\mathbb{D}_0$=(00111) ($D_0 = 3$) in the positive sense by 6 units to reach $\mathbb{D}$= (11111) ($D = 5$).
Then,
$\mathbb{P}$= (11000)
$P_M = 1 \oplus 1 = 0$
$\pi\mathbb{P}$= (00011)
This indicates correctly the displacement by 2 units in the positive sense.

Example C

The condition advances from the origin $\mathbb{D}_0$= (00111) ($D_0 = 3$) in the positive sense by 6 units to reach $\mathbb{D}$=(10000) ($D = 9$).
Then,
$\mathbb{P}$= (10111)
$P_M = 1 \oplus 0 = 1$
Thus, the bits in $\mathbb{P}$ to be transposed to the left side of the foremost bit therein is found to be "111", the preceding bit of which is in the condition of "0".
$\therefore$ $\pi\mathbb{P}$= (11110)
This correctly indicates the displacement by 6 units in the positive sense.

Figure 17:
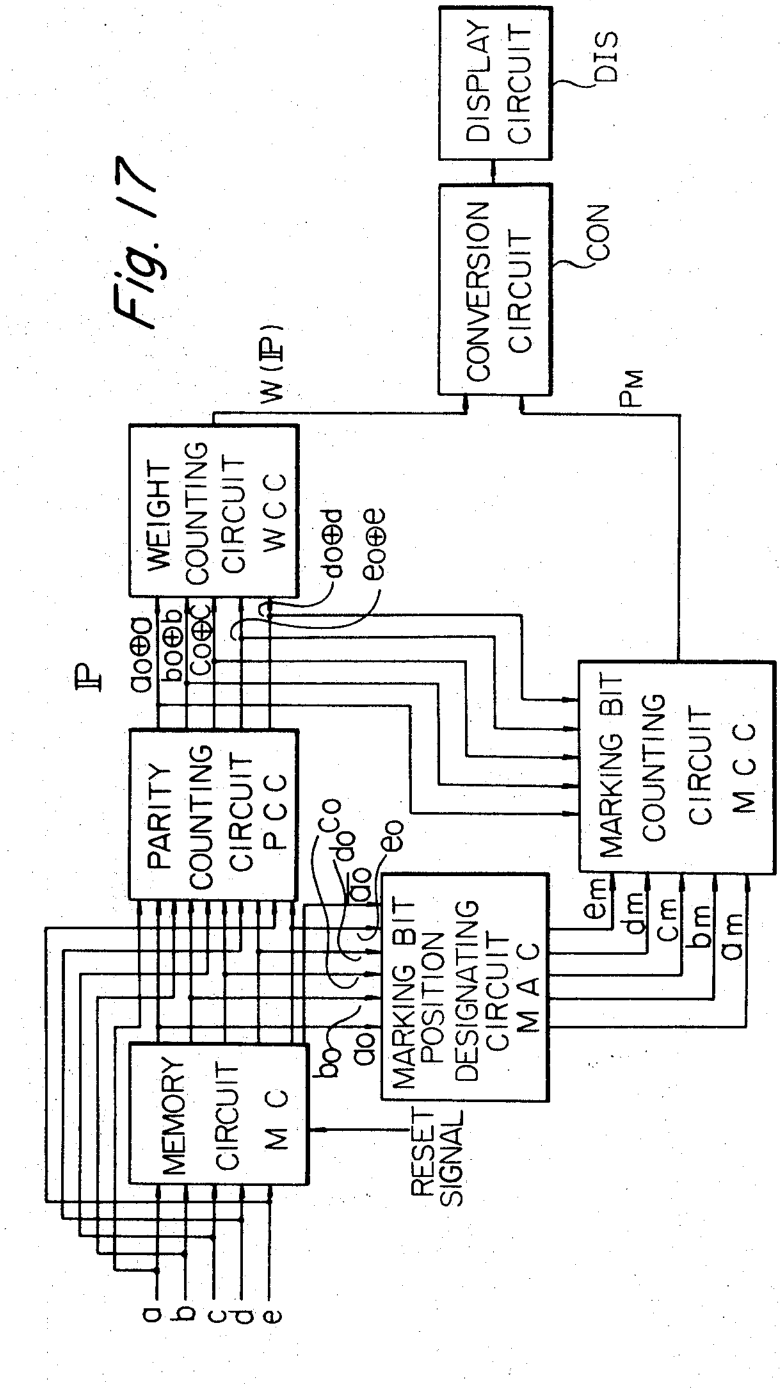
FIG. 17 is a block diagram showing the embodiment of the electric circuit of the division logic circuit using the marking bits shown in FIG. 16.

FIG. 17 shows an embodiment of the division logic circuit described above. This circuit comprises a memory circuit $M_C$ adapted to receive input code signals $a$, $b$, $c$, $d$, $e$ and reset signal so that, when the reset signal is supplied, the input code signals are memorized therein as the origin $\mathbb{D}_0$=($a_0$, $b_0$, $c_0$, $d_0$, $e_0$,). This memory circuit $M_C$ is constituted by five flip-flop circuits $FF_1$ – $FF_5$ as shown in FIG. 6. The origin code $\mathbb{D}$= ($a_0$, $b_0$, $c_0$, $d_0$, $e_0$) is supplied to a parity calculating or counting circuit PCC to which the input code signals $a, b, c, d, e$ are also supplied so that the parity code $\mathbb{P} = (a_0 \oplus a, b_0 \oplus b, c_0 \oplus c, d_0 \oplus d, e_0 \oplus e)$ is obtained as the output thereof. The thus obtained parity code $\mathbb{P}$ is supplied to a weight calculating or counting circuit WCC so as to count the weight of the parity code $\mathbb{P}$, i.e., the number of the components of the parity code $\mathbb{P}$ which are in the condition of "1".

In order to generate the parity $P_M$ in the marking bit position, a marking bit position designating circuit MAC is connected to the memory circuit $M_C$ so as to receive the origin code $\mathbb{D}_0 = (a_0, b_0, c_0, d_0, e_0)$ as well as the inverted signal $\bar{a}_0$ of $a_0$ from the memory circuit $M_C$ so that an output $(a_m, b_m, c_m, d_m, e_m)$ is produced as described below. The marking bit position designating circuit MAC is so constructed that it compares $\bar{e}_0$ with $a_0$; $a_0$ with $b_0$; $b_0$ with $c_0$; $c_0$ with $d_0$; $d_0$ with $e_0$; $e_0$ with $\bar{a}_0$, and, when the two signals compared coincide with each other, the output is made "0" but, when the two signals differ from each other, the output "1" is produced so that the conditions of the components $a_m$, $b_m$, $c_m$, $d_m$, $e_m$ are determined by the respective pairs of signals compared with each other.

As is clear from FIG. 16, the marking bit position is at the right side of the combination of the two signals compared with each other which produce the output "1".

For example, when an input (01111) of (10000) is supplied to the marking bit position designating circuit MAC, the output obtained by the comparison of the first component $a_0$ with the second component $b_0$ is made "1". Therefore, the second component $b_0$ from the left in the input code signal $(a_0, b_0, c_0, d_0, e_0, \bar{a}_0)$ is made the marking bit $b_m$ as seen from FIG. 16. Since the sixth component is $\bar{a}_0$, the first component $a_0$ is made the marking bit $a_m$ when the input code signal (000001) or (111110) is applied to the marking bit position designating circuit MAC. The marking bit position designating signals $a_m$, $b_m$, $c_m$, $d_m$, $e_m$ produced as above are supplied to a marking bit calculating or counting circuit MCC to which the output code signal of the parity counting circuit PCC is also supplied.

The marking bit counting circuit MCC receives the vector $(a_m, b_m, c_m, d_m, e_m)$ produced the marking bit position designating circuit MAC and the parity vector $\mathbb{P}_M$ is calculated with respect only to the components the condition of which is "1".

In other words, only the values of components of $(a_0 \oplus a, b_0 \oplus b, c_0 \oplus c, d_0 \oplus d, e_0 \oplus e)$, which produce the output "1" in the marking bit position designating circuit MAC, are brought into consideration.

To this end, the marking bit counting circuit MCC is so constructed that it receives each of the components of the output of the parity counting circuit PCC as well as one of the components of the output $(a_m, b_m, c_m, d_m, e_m)$ from the marking bit position designating circuit MAC so that the logic product or logic "and" of the respective pair of components is produced as the output of the marking bit counting circuit MCC. Thus, when an output of logic "1" is produced in either one of the components of the output of the marking bit counting circuit MCC, the marking bit $P_M$ is made "1". The leftmost bit $(\pi\mathbb{P})$ a of the code vector $\pi\mathbb{P}$ is designated by the marking bit $P_M$. Therefore, the displacement to be measured can be obtained by the combination of the output representing the weight of $\mathbb{P}$ obtained by the weight counting circuit WCC with the marking bit $P_M$ obtained by the marking bit counting circuit MCC.

In FIG. 17, the circuit for obtaining the above combination is shown as a conversion circuit CON and a display circuit DIS.

Figure 18:
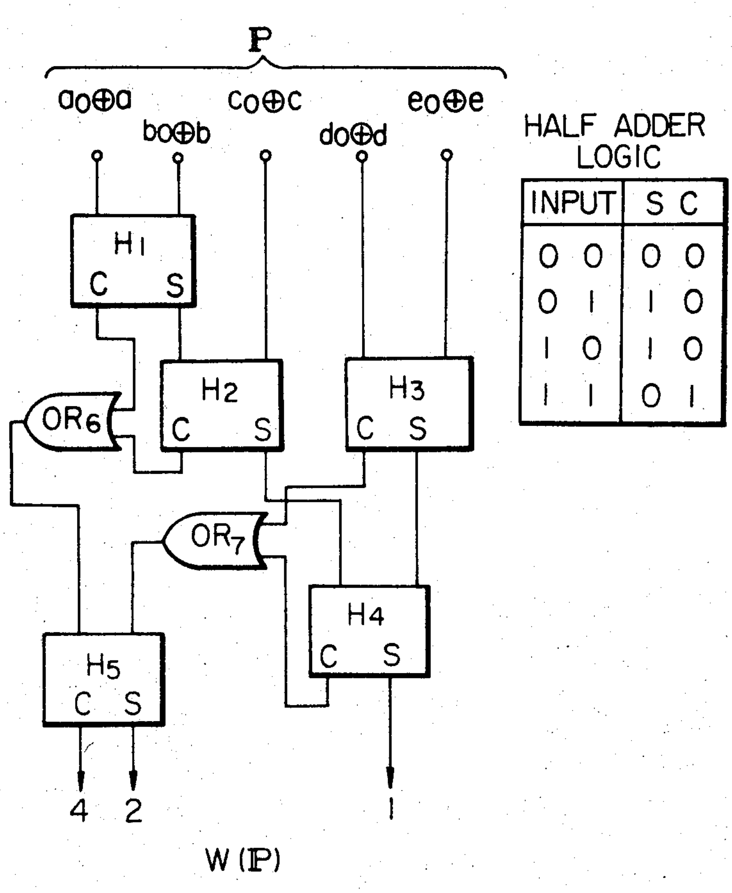
FIG. 18 is a diagram showing an embodiment of the weight counting circuit used in the logic circuit of FIG. 17.

FIG. 18 shows an embodiment of the weight counting circuit WCC. In this embodiment, five half adders $H_1$–$H_5$ and two "or" gates $OR_6$, $OR_7$ are provided which are connected as shown. As is well known, a half adder has two inputs and two outputs one of which is the sum signal $S$ while the other is the shifting-up signal $C$. When both inputs are 0, both the sum signal and shifting-up signal $S$, $C$ are 0, while either one of the two inputs is 1, the sum signal $S$ is 1 and the shifting-up signal $C$ is 0. When both inputs are 1, the sum signal $S$ is made 0 while the shifting-up signal $C$ is 1.

The components of the parity code signal $$\mathbb{P} = (a_0 \oplus a, b_0 \oplus b, c_0 \oplus c, d_0 \oplus d, e_0 \oplus e)$$

from the parity counting circuit PCC shown in FIG. 17 are supplied to two input terminals of the half adder $H_1$, one of the input terminals of the half adder $H_2$ and two input terminals of the half adder $H_3$, respectively. The "or" gate $OR_6$ is connected to the $C$ output terminal of the half adder $H_1$ and the $C$ output terminal of the half adder $H_2$ the other input terminal of which is connected to the $S$ output terminal of the half adder $H_1$ while the "or" gate $OR_7$ is connected to the $C$ output terminal of the half adder $H_3$ and the $C$ output terminal of the half adder $H_4$ the input terminals of which are connected to the $S$ output terminal of the half adder $H_2$ and the $S$ output terminal of the half adder $H_3$. The output each of the "or" gates $OR_7$ and $OR_7$ are connected to the input terminals of the half adder $H_5$ so that the output $S$ of the half adder $H_4$ and the outputs $C$ and $S$ of the half adder $H_5$ are available. The weight of the output $S$ of the half adder is set to 1 while the weight each of the outputs $S$ and $C$ of the half adder $H_5$ is set to 2 and 4, respectively.

For example, when an input $\mathbb{P} = (11001)$ is supplied to the weight counting circuit WCC of FIG. 18, the output $S$ of the half adder $H_4$ and the output $S$ of the half adder $H_5$ are made "1", thereby resulting in an output signal indicating the weight set to $1 + 2 = 3$. When an input $\mathbb{P} = (11111)$ is supplied, the output $S$ of the half adder $H_4$ and the output $C$ of the half adder $H_5$ is made 1 so that an output signal is generated which indicates the weight set to $1 + 4 = 5$.

Figures 19, 20:
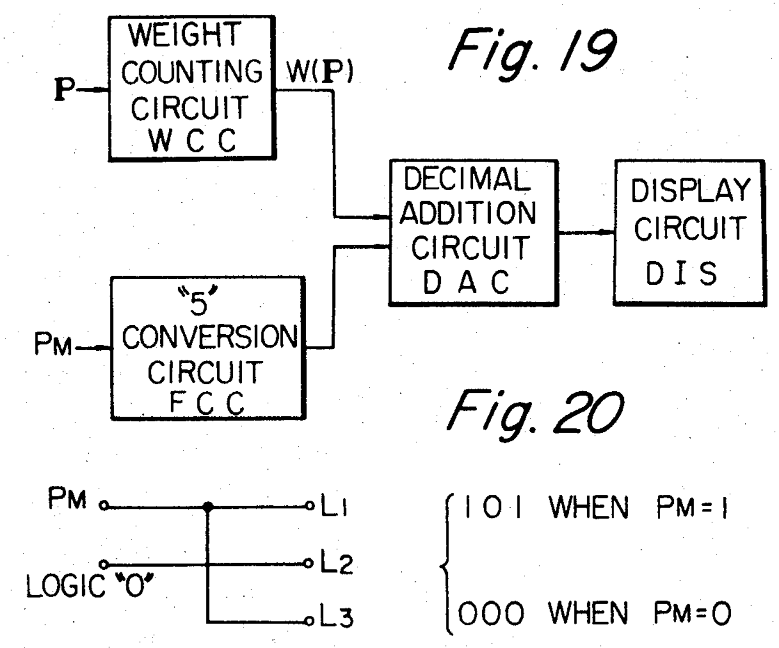
FIG. 19 is a block diagram showing an embodiment of the bit conversion and display circuits used in the logic circuit of FIG. 17.
FIG. 20 is a diagram showing an embodiment of "5" con-version circuit used in the bit conversion circuit of FIG. 19.

FIG. 19 shows an embodiment of the circuit by which the displacement is obtained by the weight W $(\mathbb{P})$ of the parity vector $\mathbb{P}$ (i.e., the number of the components which are "1") and the marking bit parity $P_M$ from the marking bit counting circuit MCC. In this case, the weight W $(\mathbb{P})$ of the parity vector $\mathbb{P}$ is counted. When the marking bit parity $P_M = 0$, the obtained value of the weight is directly indicated of the displacement. When the marking bit parity $P_M = 5$, the value of the weight with the number "5" added thereto is directly indicative of the displacement. Therefore, the circuit of FIG. 19 includes a "5" conversion circuit FCC which receives the parity $P_M$ and operates so as to add the number "5" to the weight when $P_M = 1$.

The "5" conversion circuit FCC is of a simple as shown in FIG. 20. In this circuit, the parity $P_M$ is lead to logic output $L_1$ terminals and $L_3$ while logic "0" is lead to logic output terminal $L_2$. Therefore, when $P_M = 1$, the logic output $L_1$ $L_2$ $L_3$ is displayed as 101 by the binary counting system. When $P_M = 0$, then the logic output $L_1$ $L_2$ $L_3$ is displayed as 000. The logic output of FIG. 20 and the output of the weight counting circuit WCC are applied to the decimal addition circuit DAC well known in the art and the output thereof is supplied to the display circuit DIS so that the indication of "0" to "9" units can easily be given.

Since the circuit of FIG. 19 is a mere code conversion circuit and is constructed by gate logic circuit, the entire elements can be arranged compactly in one unit.

Figure 21:
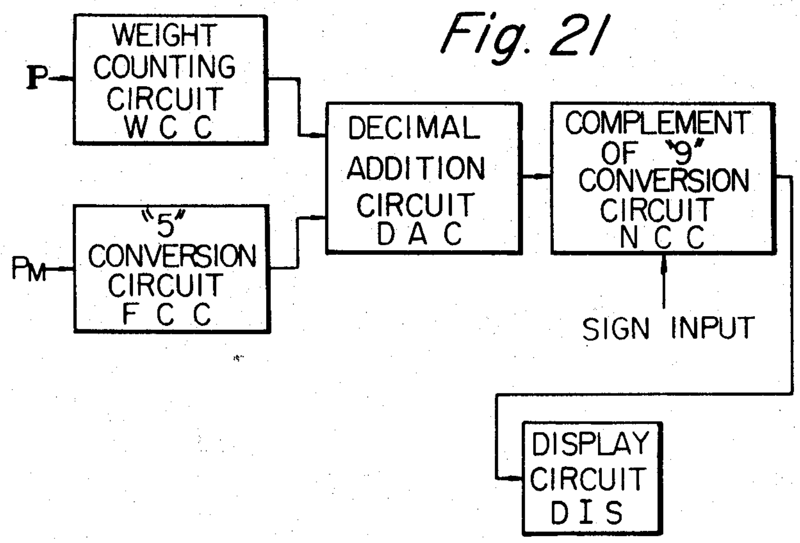
FIG. 21 is a block diagram showing another embodiment of the bit conversion and display circuits in the logic circuit of FIG. 17.

The indication by the absolute value of the displacement in the case of subtraction counting can also be given by further adding a complement of "9" conversion circuit NCC as shown in FIG. 21 so that an output is displayed in which the complement of "9" conversion is experienced when the input signal is negative while no such conversion in effected when the sign input is positive, thereby permitting the indication of the absolute value of the displacement to be easily given.

In case in which the sign of the displacement is made negative, the marking bits encircled by double lines as shown in FIG. 16 may be used instead of providing the complement of "9" conversion circuit NCC so that the selected marking bit is used in like manner as described previously.

In this case, the circuit is so constructed that the marking bit position designating circuits are selectively used depending upon the positive sign or negative sign of the sign input so that an output is obtained in the positive (or negative) sign of the sign input which is distinguished from that obtained in the negative (or positive) sign of the sign input. In this case the complement of "9" conversion circuit NCC as shown in FIG. 21 is dispensed with thereby making it possible to simplify the entire circuit.

Figure 22:
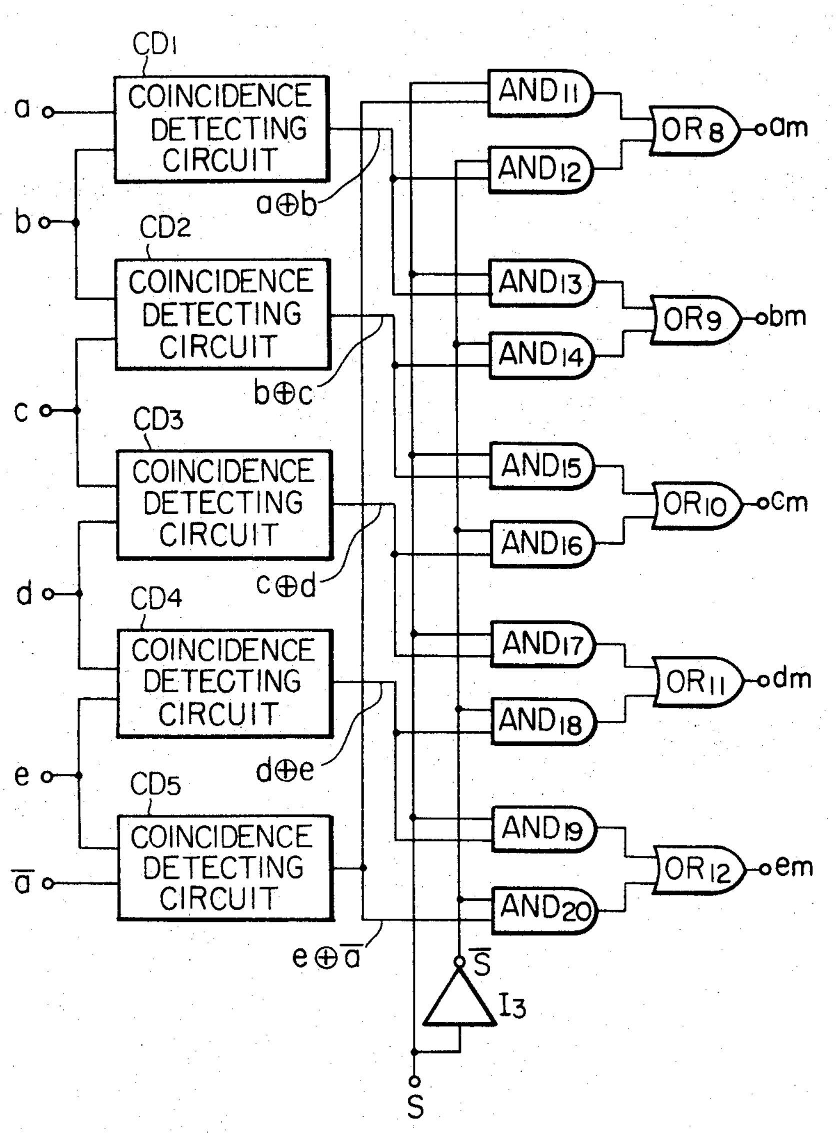
FIG. 22 is a diagram showing an embodiment of the marking bit position designating circuit used in the logic circuit of FIG. 17.

FIG. 22 shows an embodiment of the marking bit position designating circuits selectively used depending upon the positive or negative sign of the sign input.

The input signals $a, b, c, d, e, \bar{a}$ are supplied to the circuit and the following logic output is obtained:

$$a_m = S\ (\bar{a} \oplus e) \vee \bar{S}\ (a + b)$$
$$b_m = S\ (a \oplus b) \vee \bar{S}\ (b + c)$$
$$c_m = S\ (b \oplus c) \vee \bar{S}\ (c + d)$$
$$d_m = S\ (c \oplus d) \vee \bar{S}\ (d + e)$$
$$e_m = S\ (d \oplus e) \vee \bar{S}\ (e + \bar{a})$$

The circuit of FIG. 22 comprises five coincidence detecting circuits $cD_1$– $cD_5$ adapted to receive the signals $a, b, c, d, e, \bar{a}$, respectively, so that the comparison of $a$ with $b$; $b$ with $c$; $c$ with $d$; $d$ with $e$; $e$ with $\bar{a}$ is effected in the respective coincidence detecting circuits $cD_1$–$cD_5$ so as to produce an output "1" in each coincidence detecting circuit when the two inputs differ from each other. The outputs of $cD_1$–$cD_5$ are supplied to "and" gates $AND_{12}$ and $AND_{13}$; $AND_{14}$ and $AND_{15}$; $AND_{16}$ and $AND_{17}$; $AND_{18}$ and $AND_{19}$; $AND_{20}$ and $AND_{11}$, respectively. Sign input $S$ is supplied commonly to $AND_{11}$, $AND_{13}$, $AND_{15}$, $AND_{17}$, $AND_{19}$ while the inverted sign signal $\bar{S}$ obtained from the sign signal $S$ through an inversion circuit $I_3$ is commonly supplied to $AND_{12}$, $AND_{14}$, $AND_{16}$, $AND_{18}$, $AND_{20}$. The outputs of $AND_{11}$ and $AND_{12}$; $AND_{13}$ and $AND_{14}$; $AND_{15}$ and $AND_{16}$; $AND_{17}$ and $AND_{18}$; $AND_{19}$ and $AND_{20}$ are supplied to "or" gates $OR_8$, $OR_9$, $OR_{10}$, $OR_{11}$, $OR_{12}$, respectively, so as to produce the output signals $a_m$, $b_m$, $c_m$, $d_m$, $e_m$ from the respective "or" gate $OR_8$–$OR_{12}$.

I claim:

1. A division logic circuit in which a number represented by a specific combination of bits in a digital signal, only one bit of which is changed at a time, is converted into a number which is measured from an origin selected by an optional combination of the bits in the signal, wherein the improvement comprises:

a memory circuit for memorizing the combination of bits in the signal to be used for the origin;

a parity counting circuit for producing first parity signals from logical operations performed on corresponding bits of the digital signal stored in the memory circuit and the digital signal to be converted;

a marking bit counting circuit for producing a second parity signal in accordance with a predetermined marking bit position;

a weight counting circuit, connected to said parity counting circuit, for determining the weight to be accorded to the parity of said first parity signals; and a conversion circuit, connected to said weight counting circuit and to said marking bit counting circuit for combining the bits of the signal to be converted on the basis of the weight of the first parity signals and the second parity signals as determined from the predetermined marking bit position, the thus obtained combination being indicative of the desired number measured from the origin.

2. A division logic circuit in which a number represented by a specific combination of bits in a digital signal, only one bit of which is changed at a time, is converted into another number which is measured from an origin selected by an optional combination of the bits in the signal, wherein the improvement comprises:

a memory circuit comprising a plurality of flip-flop circuits for memorizing the combination of bits in the signal to be used as the origin, one flip-flop circuit being provided for each bit in the digital signal to be converted, said flip-flop circuits receiving in common a reset signal for memorizing the bits of the signal to be utilized as the origin;

a parity circuit comprising a first plurality of "exclusive - or" circuits for producing "exclusive - or" outputs from corresponding bits in the signal stored in the memory circuit and the signal to be converted, to yield the number measured from the selected origin, one "exclusive - or" circuit being provided for each bit in the digital signal to be converted, each "exclusive - or" circuit receiving one bit of the signal to be converted and the output from the corresponding flip-flop circuit;

a cyclic transposition circuit comprising a plurality of single transposition circuits connected in cascade for effecting cyclic transposition in the bits of the output signal from said parity circuit in regular order, the number of single transposition circuits being one less than the number of bits in the digital signal to be converted; and a control circuit comprising a second plurality of "exclusive - or" circuits for producing a control signal from the bits of the digital signal stored in said memory circuit to actuate said cyclic transposition circuit, the number of "exclusive - or" circuits in said second plurality being one less than the number of bits in the signal to be converted, each "exclusive - or" circuit in said second plurality receiving in common the output of a first one of said flip-flop circuits and, exclusively, the output of another one of said flip-flop circuits, the outputs of said second plurality of "exclusive - or" circuits being connected to said single transposition circuits, respectively.

* * * * *